Patented Dec. 26, 1933

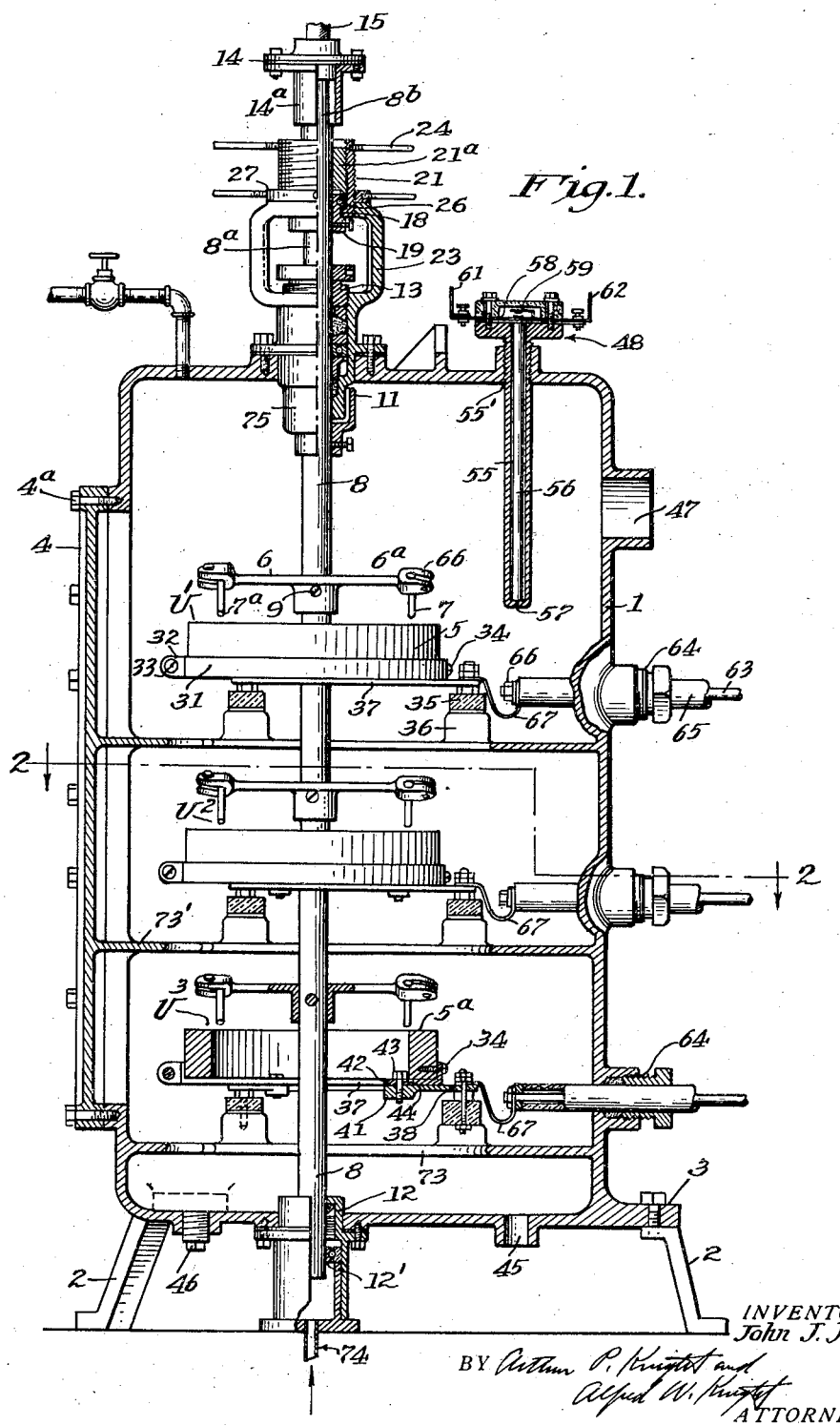

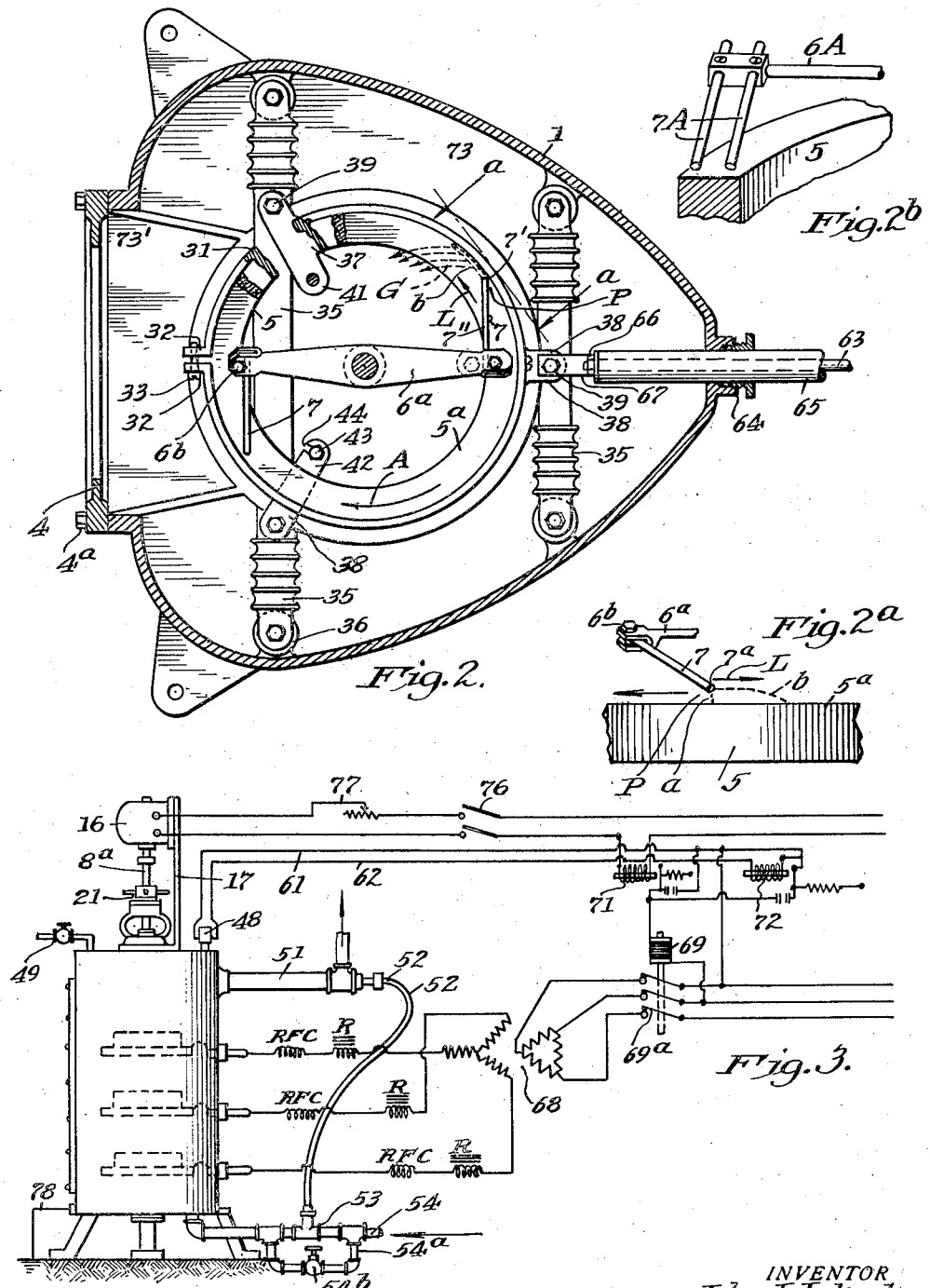

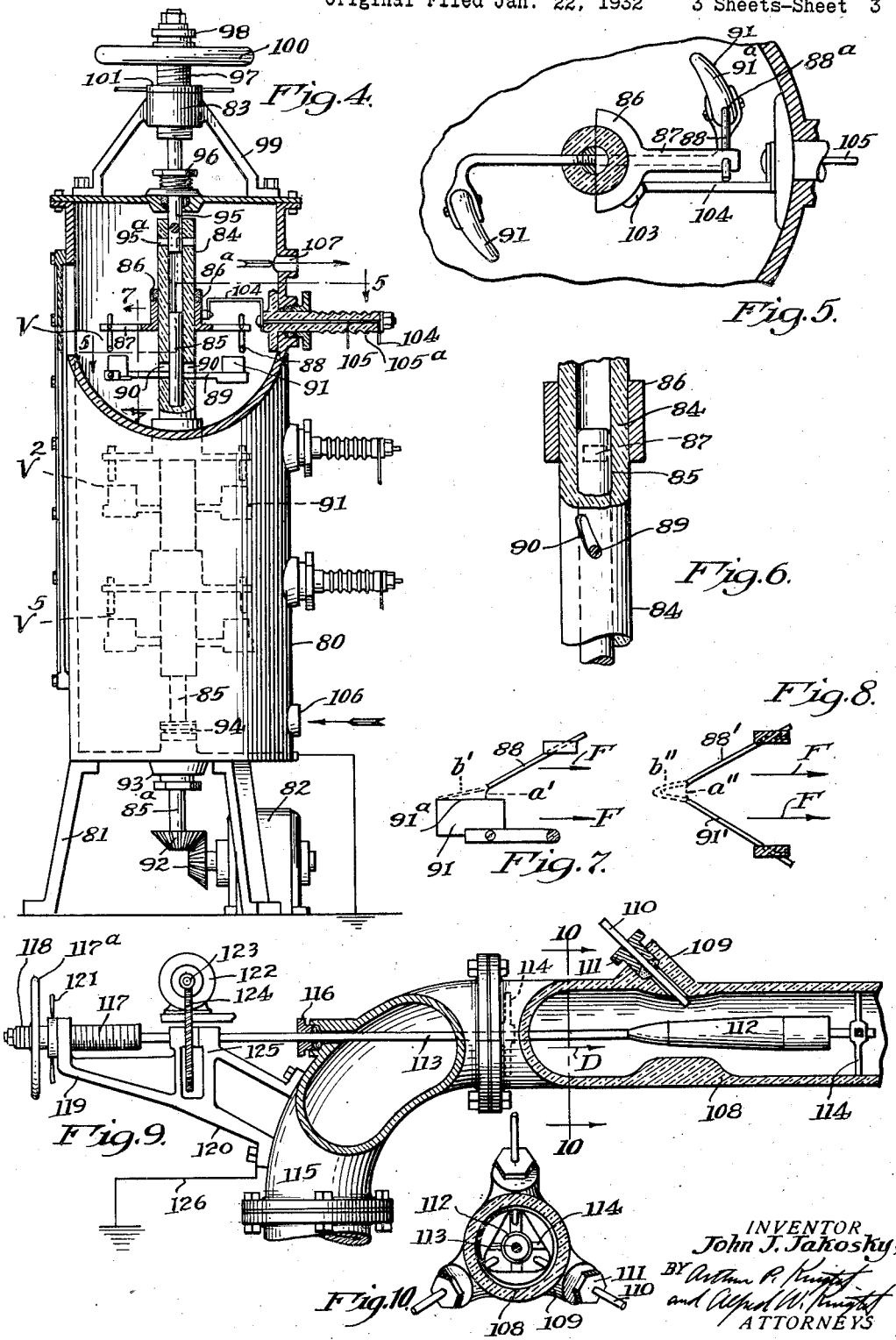

1,941,009

UNITED STATES PATENT OFFICE 1,941,009

APPARATUS FOR ELECTROTHERMAL DISSOCIATION OF ORGANIC LIQUIDS

John J. Jakosky, Los Angeles, Calif., assignor to Electroblacks Incorporated, Culver City, Calif., a corporation of Nevada Original application January 22, 1932, Serial No. 588,146. Divided and this application February 20, 1933. Serial No. 657,687

12 Claims. (Cl. 13—7)

The present invention relates to an apparatus for the electrothermal dissociation of organic liquids for the production of carbon-black, hydrogen, unsaturated hydrocarbon compounds, and the like, by means of an electric arc discharge between electrodes submerged beneath the surface of a body of such liquid, and is particularly applicable to the production of carbon-black by such dissociation of hydrocarbon oils or other carbon bearing liquids. This application is a division of my earlier application Serial No. 588,146 filed January 22, 1932.

In apparatus which have heretofore been commonly employed for effecting electrothermal dissociation of organic liquids, a number of very serious operating difficulties have been encountered. In the first place, it has been found extremely difficult, in practice, to maintain sufficient contact of the arc with the dissociable liquid to provide an efficient utilization of the energy of said arc in bringing about dissociation of the liquid and production of a high yield of the desired dissociation products. Inasmuch as dissociation of the liquid is largely dependent upon direct contact thereof with the arc, it is evident that the rate at which fresh surfaces of such liquid may be exposed to the surface of the arc is a factor of paramount importance. It may be pointed out that, in processes of this sort, the products of dissociation are formed in direct contact with the arc, and both solid and gaseous products thus formed tend to prevent contact of the arc with fresh portions of liquid, unless adequate means are provided for removing such products from the arc. Furthermore, if such dissociation products are permitted to remain unduly long in the arc or in contact therewith, deleterious effects are sometimes produced thereon. For example, carbon formed by electrothermal dissociation of organic liquids is initially produced in a very finely divided condition and possessed of certain physical and chemical properties by reason of which it is a highly valuable product known as carbon-black, but if it is permitted to remain at the high temperature of the arc for any considerable period after its initial formation, its size and other physical and chemical properties are so altered as to greatly lessen its value or to even render it entirely unsuitable for use as carbon-black. These deleterious effects are, of course, of particular importance when the production of carbon-black is a major object of the process.

Another difficulty which has been encountered is the heating of the electrodes themselves by contact with the arc, which represents a direct loss of energy in unnecessary heating of the electrodes instead of in dissociation of the liquid. The heated electrodes give up heat to the liquid at positions removed from the arc, but heat so delivered to the liquid serves only to raise the temperature of the main body of liquid instead of producing dissociation thereof, as dissociation does not ordinarily occur to an appreciable extent at any temperature thus attained in the body of oil outside the arc.

Another disadvantage has been the tendency to deposit excessive amounts of carbon on the electrodes. In the ideal operation of the process, the carbon produced should all be disseminated or dispersed into the liquid medium surrounding the arc and remain suspended therein, and only those particles of carbon which behave in this manner are actually recoverable as carbon-black. Any carbon which deposits on the electrodes is of a hard, gritty nature and substantially valueless, even if it could be removed from the electrodes in any practicable manner and converted to finely divided condition. Production of this type of carbon, therefore, decreases the efficiency of carbon-black production, not only on the basis of electrical energy expended but also on the basis of the amount of liquid consumed. Also particles of this hard, gritty, coarse carbon deposited on the electrodes may break off and become mixed with the carbon-black. Such particles must be subsequently separated from the carbon-black, and such separation further increases the cost of production.

Furthermore, the excessive building up of carbon on the electrodes interferes with the maintenance of proper arcing conditions, as it forms irregular arcing faces on the electrodes, causes the arc to depart from its desired position, shortens the arc gap, and in some cases completely short-circuits the electrodes, thus entirely preventing further arcing until the deposited carbon is removed.

This deposition of carbon on the electrodes may be due, in part at least, to localized heating of the arcing surfaces of the electrodes and to failure to provide for wetting of such arcing surfaces with fresh oil, as it has been found that when the arc takes place between electrode surfaces which are not kept wetted by undissociated oil and which are permitted to reach a high temperature approximating that of the arc itself, there is a tendency for such deposition to occur due to dissociation occurring upon contact of the liquid, or vapors thereof, with such hot, non-wetted electrode surfaces.

This carbon deposition may also be due, to a greater or less extent, to the precipitation upon the electrode surfaces of ionized or electrically charged carbon particles, formed by dissociation out in the main body of the arc, such precipitation taking place by reason of the electrical field existing within the arc. Such action seems to occur to the greatest extent when a unidirectional arc is employed, as the electrical field then acts to continually drive ionized or charged particles in the same direction, but also occurs to some extent with an alternating current arc unless adequate means are provided to prevent it.

Among other difficulties which have been encountered may be mentioned the high relation of striking potential to operating potential, and the inability to use an arc of relatively high current without decreasing the efficiency of utilization of electrical energy. Both of these factors have limited the power input per arc which may be economically maintained without excessively high striking voltages, and the high ratio of striking to operating potential has seriously increased the consumption of electrical energy, and produced a low power factor as will be hereinafter explained.

It is well known that a relatively high voltage is required to strike an arc through a poorly conducting liquid medium but that after the arc is once started, if the length of arc gap remains the same, the voltage between the electrodes drops to a relatively low value due to the greatly increased conductivity of the ionized medium. In an alternating current arc, the arc breaks each half cycle, as the voltage in one direction approaches zero, and a new arc must be formed as the voltage starts to increase in the opposite direction. The average operating potential across the arc must, therefore, be considerably below the maximum line voltage available for initiating the arc at each half cycle and also, if the striking potential is high in proportion to the maximum line voltage the arc will be maintained during only a relatively small part of each half cycle. As the power input per arc is a direct function of the average operating voltage and of the time during which arcing is maintained, it is evident that, with a given available voltage in the supply circuit, the greater the difference between the striking potential and the operating potential the less will be the power input in the arc and consequently the less the dissociation obtained. Furthermore, if the operating potential is relatively low as compared to the striking potential, a relatively large reactance must be provided in series with the arc, thus increasing the cost and size of the installation required for energization of the dissociation apparatus, and producing a low power factor.

The relatively high ratio of striking potential to operating potential, obtained in electrothermal dissociation apparatus heretofore employed, has been due, in some cases, to the fact that the apparatus was so designed that the new arc formed at each reversal of the voltage must strike through a new portion of substantially non-ionized liquid medium instead of through the ionized medium through which the preceding arc occurred. In other cases, it has been due to the failure to provide for elongation of the arc path after the arc was formed. Although it has previously been attempted, in certain types of apparatus previously disclosed, to increase the length of the arc after it was formed, the means provided for that purpose were relatively ineffective. Furthermore, it is not known that any such type of apparatus has heretofore been so designed as to provide for rapid elongation of the arc path after formation of each arc and at the same time maintain an effectively ionized medium in proximity to the electrodes and to maintain a sufficiently short path between the electrodes, through said ionized medium, to permit formation of a new arc at relatively low striking potential.

As regards the limitation on current flow per arc, in previous types of apparatus, this is believed to have been due, on the one hand, to a limitation of the area of arcing surfaces of the electrodes which could be used without interfering with access of oil to the arc therebetween and, on the other hand, to a limitation of the effective current density, which could be employed in previous types of apparatus without causing undue heating of the electrodes and deposition of carbon thereon.

The principal object of this invention is to provide an apparatus adapted for the electrothermal dissociation of organic liquids for the production of carbon-black or for other purposes, in a more efficient and economical manner than has been heretofore realized. With this end in view, it may be considered as a general aim of this invention to provide an apparatus which overcomes or minimizes all of the above mentioned disadvantages previously encountered.

An important object of the invention is to provide an apparatus capable of obtaining a very high efficiency of production of carbon-black for a given consumption of electrical energy and dissociable liquid. A further object is to provide an apparatus capable of a high rate of production of carbon-black in an apparatus of minimum size, cost, and electric power requirements.

A particular object of the invention is to provide an apparatus which obtains maximum contact of the electric arc with dissociable liquid in order to obtain a maximum amount of dissociation and carbon-black production. One means of obtaining such increased contact of the arc with the liquid according to this invention consists in establishing an arc in a zone which is continuously maintained in an ionized and highly conductive condition between continuously opposed surfaces of oppositely charged electrodes, and causing continuous relative movement of said arcing zone with respect to the liquid, either by moving the arcing zone through the liquid or by moving the liquid past the arcing zone, or both, whereby fresh surfaces of dissociable liquid are continually brought into contact with the arc. Furthermore the ionized arcing zone is preferably caused to be extended or elongated in the path of relative movement of the arcing zone and liquid so as to increase the lateral surfaces of the arcing zone and thus provide maximum area of contact with the liquid for an arc of given size. The relative area of contact of the arc with the liquid, as compared to the size of the arc is also preferably increased by so forming at least one of the electrodes as to cause at least one of the dimensions of the arc in a plane transverse to the path of relative movement of the arc and liquid to be quite small as compared to the length of the arc. In other words, the arc is caused to assume the shape of a distorted pencil having relatively small thickness and relatively great length, with its lateral surfaces exposed to contact with the liquid, and the nature of the relative motion of the liquid is such as to continually bring fresh portions thereof into contact with these lateral surfaces.

A further object of the invention is to promote rapid removal of products of dissociation from the arcing zone and from contact with the arc, not only for the purpose of preventing injury to such products by prolonged subjection to high temperature but also for the purpose of preventing such products of dissociation from interfering with the contact between the arc and the dissociable liquid. Furthermore, in case the path of relative movement of the arc and liquid is of circular shape, or is a closed path of other shape, it is desired to remove the gaseous products of dissociation not only from the momentary position of the arc but also from such path of relative movement, so that gaseous products of dissociation formed when the arc and liquid are at one relative position in the path of movement thereof will not be again brought into contact with the arc when the arc and liquid again reach the same relative position. The apparatus of this invention provides for removal of products of dissociation from the arcing zone principally by the high velocity relative movement of the arc with respect to the liquid. When the path of relative movement is substantially circular, as in the preferred embodiments of the invention hereinafter described, centrifugal force also acts to a very large extent to remove the gaseous dissociation products from the arcing zone and from the path of movement.

A further object of the invention is to minimize heating of the electrodes by contact with the arc, and thus obtain maximum efficiency of utilization of electrical energy in causing dissociation of the liquid, since, as is pointed out above, heat taken up by the electrodes themselves is of no use in effecting dissociation but merely serves to raise the general temperature of the liquid outside the dissociation zone. For this purpose, the arc is caused to have a minimum amount of contact with the electrodes themselves.

A further object of the invention is to eliminate or minimize deposition of carbon on the surfaces of the electrodes, and thus permit substantially all of the carbon formed by dissociation to be recovered in the form of carbon-black, while at the same time preserving the desired shape and relative disposition of the electrode surfaces, free from excessive carbon deposits, and preventing short-circuiting therebetween. This object is accomplished in part by minimizing the temperature to which the arcing faces of the electrodes are heated, both by minimizing the contact of the arc with the electrodes as above described and thus reducing the quantity of heat transferred to the electrodes, and also by cooling certain of the arcing faces by contact with liquid. Another means which is preferably employed for preventing deposition of carbon on the electrode surfaces consists in moving certain of the electrode surfaces at which arcing occurs, in a direction away from the arc at a velocity sufficient to prevent precipitation upon such surfaces of carbon formed within said arc, by the electrical precipitating action of the electrical field within the arc. In order to accomplish this, such electrode surfaces are preferably moved away from the arc at a velocity greater than the velocity of migration of electrically charged carbon particles in said electrical field.

A further object of the invention is to reduce the striking potential required to form an arc between the electrodes when alternating current is employed. This aim of the invention may be more specifically expressed as the maintenance of the maximum ratio of operating potential to striking potential. This not only decreases the size and cost of auxiliary electrical apparatus required, but also increases the power input per arc, for a given maximum voltage available. According to this invention, this last mentioned object is attained by the continual maintenance of an ionized gaseous zone within a body of liquid and between continuously opposed surfaces of oppositely charged electrodes. For this purpose, the invention provides for maintaining a definite limited quantity of ionized gas in the region of the shortest path between the electrodes, said electrodes having arcing surfaces which are continually within arcing distance of one another along said shortest path, so that, since the voltage during any half-cycle of the alternating current reaches a sufficient value to form an arc through the ionized medium between said portions of the electrode surfaces, an arc will be formed. Furthermore, the arc is moved relative to the oil in such manner and at such velocity as to immediately extend or elongate the arc thus formed, and the electrode surfaces are of such shape and disposition, with respect to this relative movement, as to permit such extension or elongation to occur, while providing a "pocket" adjacent one of the electrodes and protected from the passing liquid, which performs the above stated function of retaining a limited quantity of ionized gas in the region of the shortest path between the electrodes. Thus, the voltage required to initially form the arc is reduced to a minimum, while an arc of maximum length is thereafter maintained throughout that half cycle until the voltage drops to a value at which such arc can no longer be maintained.

A further object of the invention is to provide an apparatus adapted to produce a highly satisfactory grade of carbon-black which, after separation from the liquid medium in which it is formed, may be advantageously used for various purposes, such as compounding with rubber, or which may be used, either before or after separation from such liquid, in the manufacture of printing ink or other ink or pigment.

Another object of the invention is to provide an apparatus of the type above mentioned, in which the consumption of the electrodes is minimized, which not only permits continuous operation over a long period with a minimum need for readjustment of the electrode spacing but also minimizes the expenditure required for replacement of electrodes.

A further object of the invention is to provide an apparatus capable of increased smoothness of operation of the electric arc submerged beneath the liquid, due to the continuous maintenance of an ionized conductive arcing zone between the electrodes.

In the apparatus of the present invention means are provided for maintaining an electric arc between oppositely charged electrodes having opposing arcing surfaces submerged beneath the surface of a body of liquid, one of said electrodes being of relatively small cross-section and provided with a relatively small arcing surface at the end closest to the other electrode. Furthermore, means are provided for continually moving said one electrode at high velocity with respect to the liquid, so as to cause the gaseous medium or zone in which the arc takes place to trail behind said one electrode due to the frictional drag of said liquid, the arcing surface of the other of said electrodes being continuously maintained in position of arcing relation with respect to said one electrode. The direction of relative movement of said one electrode is preferably substantially perpendicular to the shortest path between the two electrodes, and the relatively small arcing face of said one electrode is preferably disposed at the rearward side thereof with respect to said direction of relative movement. The velocity of relative movement of said one electrode with respect to the liquid is sufficiently high to cause each arc formed between said electrodes to be swept rearwardly of said electrode by the relative motion of the liquid past the sides of said arc, so as to define a trailing arcing zone of ionized vapors at high temperature, whose lateral surfaces are continually brought into contact with fresh dissociable liquid substantially free from gaseous dissociation products, flowing past said one electrode and said arcing zone in stream line fashion. Also, such velocity of relative movement of said one electrode should be sufficient to substantially prevent electrical precipitation of carbon particles from the arc upon the rearwardly disposed arcing face thereof, or in other words, not less than the velocity of migration of electrically charged carbon particles at the potential gradient of the arc. For example, this relative velocity may be between 20 and 80 feet per second.

Furthermore, the width of said one electrode, in a direction transverse to the direction of relative movement thereof, is preferably quite small as compared to the length of the trailing arcing zone, for example, less than about one-third the length of said arcing zone, whereby a relatively long arc of small transverse thickness is maintained and fresh liquid is permitted to flow past said one electrode and into close contact with the respective sides of said arc, thus providing a maximum surface of contact of the arc with the liquid, for an arc of given total cross-sectional area.

Said one electrode is also preferably inclined from its arcing face forwardly in the direction of relative movement thereof and away from the path of such movement, so as to cause the arc to retain its position at the end of said electrode and prevent the arc from becoming displaced away from the end of the electrode and along the side thereof, as has been found to be the case when an electrode of this type is disposed in a direction more nearly perpendicular to the path of relative movement of said one electrode or is inclined in a direction opposite to that above described.

The other of said electrodes may be fixed and provided with an extended arcing surface, and said one electrode of small arcing surface may be moved continually at high velocity in a circular or other closed path at a uniform distance from said extended surface; or, said other electrode may also be moved concurrently with said one electrode, relative to the oil in which case the arcing surface of said other electrode may also be relatively limited, being kept in uniform arcing relation with respect to said one electrode due to such concurrent relative movement. In the latter case, however, the arcing surface of said other electrode is preferably somewhat elongated rearwardly with respect to the direction of relative motion of said electrodes, so as to permit each arc formed therebetween to be extended substantially in the path of such motion due to relative retardation of the end of the arc which is furthest removed from the electrode of relatively small arcing surface.

In the operation of an apparatus of the present invention embodying the above features the stream-line motion of the liquid past the arcing zone serves not only to extend the arc and to bring fresh liquid into contact with the sides of said arc, but also to carry the major portion of the dissociation products almost immediately out of the arcing zone. However, it will be observed that as the liquid streams past the inclined electrode and past the edges of the rearwardly disposed small arcing face thereof, a pocket is defined directly rearward of this arcing face, and a relatively small quantity of the ionized vapors and gaseous products formed within the arc are maintained in this pocket and in position between the arcing faces of the two electrodes adjacent the point of greatest proximity of said electrodes. Furthermore, this gas pocket remains in this position and retains its ionized condition even after the arc has been extinguished during each half-cycle, so that as the voltage again increases on the next half-cycle, the voltage required to strike a new arc will be reduced to a minimum, not only because of the relatively short arcing path which is always available between the electrodes but also by reason of the presence of this ionized medium in such path.

The voltage supplied to the opposing electrodes is sufficient to maintain an arc therebetween during a considerable part of each half-cycle. It is evident that, for a given maximum voltage in the supply circuit, the lower the striking voltage at which the arc is formed during each half-cycle the sooner the arc will form, and consequently the greater will be the proportion of the total duration of each half-cycle during which arcing will be maintained. For this reason, the minimizing of the striking potential as above described permits a satisfactory rate of dissociation to be obtained with a lower available line voltage than would otherwise be possible. It will be understood that the invention is not restricted as to the voltage employed, as this may vary according to the nature of the liquid being treated, the length of the arc gap between the electrodes, and other factors. However, as an example, for the dissociation of hydrocarbon liquids, and with electrodes spaced approximately one-fourth inch apart, good results have been obtained with voltages from 2,000 to 3,000 volts.

The electrodes are preferably energized with alternating current of relatively low frequency, for example, ordinary commercial frequencies, or frequencies of from 25 to 500 cycles per second. When the principal object, or a material object, of the invention in the production of carbon-black, one reason for the use of frequencies within this range is in order that the arc shall be maintained, during each half cycle, for a sufficient time to cause the dissociated liquid to dissociate as completely as possible and form a high percentage of elemental carbon. When very high frequencies are used, the duration of each arc is apparently insufficient to cause dissociation to proceed to completion, thus giving rise to high production of gas but a low yield of carbon-black. The use of alternating current is considered preferable to direct current for several reasons. In the first place, it affords an opportunity for products of reaction formed during each half cycle to be removed from the arcing zone after quenching of the arc and before the next arc is formed, so that the next arc is immediately exposed to contact with fresh oil, and a high efficiency of utilization of the electrical energy is obtained. Also, the pulsating arc appears to exert a sort of breathing effect, due to alternate forming and quenching of the arc, which facilitates movement of liquid into the arcing zone and movement of dissociation products out of said zone. Furthermore, it reduces the tendency to deposition of carbon particles on the electrodes by electrical precipitation, due to the alternate reversal of the direction of the electrical field and of the direction of movement of electrically charged carbon particles.

When I operate my improved apparatus under preferred conditions, I use a high arc current in proportion to the size of the relatively small arcing surface of said one electrode, or in other words, a high average current density based on the area of said arcing surface. Such average current density should exceed 20 amperes per square inch of total area of this arcing surface, and preferably exceeds 50 amperes per square inch, and I have found that particularly good results are obtained, in the dissociation of certain hydrocarbon oils to produce carbon-black, when this average current density is between 100 and 300 amperes per square inch. The use of this high average current density not only provides a maximum power input per arc, and consequently a maximum rate of dissociation, for an electrode of given dimensions, but also leads to maximum contact of the relatively moving liquid with both sides of the arc, by providing an arc whose width approximates the width of this electrode. It will be apparent that when an arc of this relatively great width is provided, the liquid flowing past the two sides of the rearwardly disposed end of said electrode in stream-line fashion is brought immediately into contact with the arc and remains in contact therewith throughout the entire length of the arc. If, on the other hand, the current flow were so low, relative to the area of the arcing face of this electrode, that the arc filled only a small part of the space rearwardly of said arcing face, the remainder of this space would tend to become filled with trapped gaseous products at a temperature lower than that of the arc itself and much poorer contact of the liquid with the arc would be obtained. Furthermore, the maintenance of a large arc provides a sufficient quantity of ionized vapors to effectively serve the above mentioned purpose of permitting formation of each new arc at a relatively low striking potential.

The accompanying drawings illustrate several forms of apparatus in accordance with the present invention, and referring thereto:

Fig. 1 is a vertical section of a preferred form of apparatus, with the driving means not shown;

Fig. 2 is a horizontal section of the apparatus on line 2—2 in Fig. 1;

Fig. 2a is a partial side elevation of one electrode unit, taken on line a—a in Fig. 2;

Fig. 2b is a fragmentary perspective view of an alternative form of electrode unit, showing the use of a plurality of electrodes on a single electrode arm;

Fig. 3 is a somewhat schematic or diagrammatic representation of the complete apparatus and certain auxiliary equipment together with the electrical circuit means employed for energization thereof;

Fig. 4 is a partly sectional elevation of an alternative form of apparatus;

Fig. 5 is a partial transverse section thereof on line 5—5 in Fig. 4, on somewhat enlarged scale;

Fig. 6 is a vertical section of a portion of the electrode mounting assembly thereof;

Fig. 7 is a view of the electrodes on line 7—7 in Fig. 4;

Fig. 8 is a similar view of a modified electrode system;

Fig. 9 is a longitudinal sectional partly cut away view of another alternative form of apparatus;

Fig. 10 is a transverse section thereof on line 10—10 in Fig. 9.

The apparatus shown in Figs. 1 to 3 inclusive, comprises a casing or reaction chamber 1, provided with suitable supporting feet 2 secured to lugs 3 on the lower end of said casing and a removable side closure plate 4 secured to said casing by suitable means as, for example, by cap screws 4a as shown. The apparatus is further provided with a plurality of electrode units mounted within said casing and each comprising a relatively fixed and one or more relatively rotatable electrodes, there being in the form shown, three of such units $U_1$, $U_2$ and $U_3$. I have shown three of such units for the reason that such a number, or a multiple thereof, is best adapted to be effectively energized from a three-phase power supply circuit, and, in general, I prefer to construct and operate the apparatus of the present invention in multiples of three such units.

Each electrode unit is shown as comprising a relatively fixed ring-shaped electrode 5 whose upper face 5a constitutes an arcing face formed as a surface of revolution, of relatively small width in proportion to its circumferential length, and lying preferably in a plane substantially perpendicular to its axis, and a relatively rotatable electrode holder 6 having one or more radial arms 6a each provided with clamp means 6b adjacent the outer end thereof, in which is secured a rod-shaped electrode 7 of relatively small cross-section disposed above the corresponding electrode 5 and projecting downwardly toward the extended arcing face 5a and rearwardly with respect to the direction of rotation, at a trailing angle of approximately 60° to the vertical. The electrodes 7 are preferably positioned with respect to the fixed electrode 5 as shown in Fig. 2, namely, with the upper forward end thereof substantially above the inner edge of the fixed electrode, and each electrode 7 extending outwardly and rearwardly over the fixed electrode to a point substantially over the outer edge thereof, so that, at the start of operation of the apparatus, the outer end of each electrode 7 is disposed substantially vertically above the outer edge of the opposing electrode face 5a, as shown at 7' and as said electrode 7 wears away during operation the arc will gradually creep across the face of the electrode 5, reaching the inner edge of the face 5a when the rotatable electrode has been largely consumed, to a point such as 7''. The rearward end face 7a of each electrode 7 constitutes the arcing face thereof.

The electrodes 5 and 7 may be formed of any suitable conducting material; for example, such electrodes may advantageously consist of carbon and may be manufactured in the same general manner as other carbon electrodes commonly employed for maintaining electric arcs.

It has been found that in the operation of the above type of dissociation apparatus, the movable electrode wears away very slowly and the fixed electrode has practically an indefinite life, making replacements of the fixed electrode unnecessary except at very infrequent intervals. Further, due to the trailing angle of the moving electrodes and the high velocity relative movement thereof, the arc is always formed between the rearwardly disposed arcing face 7a of said electrode and the fixed electrode, and is prevented from creeping upwardly along said electrode.

The electrode holder 6 of all the electrode units are shown as disposed on a common vertical shaft 8 and constrained to rotate therewith as by means of pins 9 extending through the hub portions of said holders and through said shaft. Said shaft is rotatably mounted within the casing or reaction chamber 1 as by means of upper and lower bearings 11 and 12 respectively and is provided with an upper end portion 8a extending through the upper wall of said casing and through a stuffing box or packing gland 13. Said shaft is further provided with a splined outer end 8b slidably engaged by a coactingly formed portion 14a of a coupling 14 secured to shaft 15 of a variable speed motor 16 supported on the casing 1 in any suitable manner as, for example, by means of bracket 17.

The rotatable electrode assembly, comprising the shaft 8 and the electrode holders 6 is preferably provided with suitable means for effecting longitudinal adjustment thereof for the purpose of obtaining vertical adjustment of the electrodes 7 with respect to the fixed electrodes 5 so as to regulate the distance therebetween. Said means may comprise a thrust bearing 18 the inner race of which is secured to the shaft 8 in any suitable manner as, for example, by means of set screw 19 and the outer race of which is positioned adjacent the lower end of a threaded adjustment sleeve 21 adapted to be engaged by a coactingly threaded portion 22 at the upper end of a hanger 23, whereby upon rotation of the sleeve 21, for example by means of spokes 24, the said sleeve will be raised or lowered in the hanger 23, which movement will be communicated to the rotatable electrode assembly through the thrust bearing 18 and thus effect adjustment of the spacing of the electrodes 7 from the electrodes 5. The outer race of the bearing 18 may be positioned with respect to the sleeve 21 by means of a lock sleeve 21a threadedly engaging the inner portion of the sleeve 21 and adapted to force the outer race into engagement with a shoulder portion 26 at the lower end of said sleeve 21, as shown. A lock ring 27 is preferably provided for the sleeve 21 whereby said sleeve may be definitely held in any one position with respect to the hanger 23.

Each fixed electrode 5 is shown as mounted on a demountable split-ring 31 provided with lugs 32 at the split and a screw or bolt 33 adapted to force said lugs together so as to clamp the lower portion of said electrode within said ring. One or more set screws 34 may also be provided at suitable positions in said ring, adapted to further secure said electrode in said ring, if desired. Suitable supporting means are provided for each fixed electrode, adapted to position said electrode concentrically with respect to the axis of rotation of the rotatable electrode assembly, and such supporting means may comprise insulators 35 bolted to lugs 36 secured to or formed integrally with the casing 1, said insulators supporting an arcuate electrode support 37 having outwardly projecting lugs 38 adapted to be secured to said insulators in any suitable manner as, for example, by means of bolts 39. The electrode support 37 is further provided with inwardly projecting lugs 41 adapted to provide support for the electrode split-ring 31, said ring having a plurality of inwardly projecting lugs 42 corresponding in number and position to the lugs 41 and adapted to be secured thereto by means of screws 43. The lugs 42 are preferably provided with slots 44 whereby the electrode 5 may be quickly disengaged from the electrode support by loosening the screws 43, rotating the ring 31 until the lugs 42 are clear of the heads of the screws 43 and lifting said ring and the electrode away from said support.

The apparatus is further provided with a liquid inlet opening 45 at the lower end of the casing, a drain 46, a discharge opening 47 for gaseous and solid dissociation products together with any undissociated liquid, a thermostatic control element 48 and a compressed air connection 49. The discharge conduit 51, connected to the discharge openings 47 is also preferably provided, as shown in Fig. 3, with a thermostatic control element 52 of any well known type adapted to control a valve 53 in the liquid inlet line 54 connected to the liquid inlet opening 45, said line 54 being preferably provided with a by-pass 54a around said valve 53 and having a manually operated valve 54b.

The thermostatic control element 48 may comprise a tubular conduit 55 threadedly disposed in an opening 55a in the upper wall of the casing 1. Within the conduit 55 is disposed a thermostatic rod 56 formed of brass or other metal which has a greater expansion under heat than that of the metal of which the conduit 55 is formed. Said rod 56 is adapted to rest upon the bottom of the conduit 55 as at 57 and the upper end of said rod is adapted, when expanded or elongated due to temperature, to contact a spring contact element 58 and force the same into electrical contact with a spring contact element 59 and thus close an electrical circuit formed in part by the wires 61 and 62, as will be subsequently described.

The fixed electrodes 5 are provided with connection to a suitable source of electric current of suitable voltage, and such connection may comprise leads 63 extending through packing glands 64 in the side wall of the casing 1 and insulated therefrom by means of suitable insulators 65 and terminating in binding posts 66 on the inner ends of said leads. Suitable flexible connectors 67 are provided to obtain electrical connection of said leads to the electrodes, which connectors are secured at one end to the binding posts 66 and at the other end to one of the bolts 39 by means of which the electrode support 37 is secured to the insulators 35, electrical connection to the electrodes 5 being then obtained through the metallic rings 31. The leads 63 are connected, through suitable radio-frequency chokes (RFC, Fig. 3) and reactors (R, Fig. 3) to a suitable source of electric power at sufficiently high voltage, such as a transformer 68 provided with a circuit breaker, such as shown at 69 and 69a, in the low-tension side of the circuit, said circuit breaker being controlled by means of relays 71 and 72 in the motor and thermostat circuits respectively, as will be subseqently described.

The casing 1 may be provided, if desired, with inwardly projecting horizontal baffles 73 and the closure plate 4 may be provided with corresponding baffles 73' so as to direct the liquid, which is caused to flow upwardly through the casing from the inlet 45, somewhat inwardly towards the electrodes. The lower bearing 12 may, if desired, be provided with a pressure oil supply through the pipe 74 so as to provide lubrication to the ball bearing means 12a. The shaft 8 may be provided with a suitable throw-off ring 75 just below the top of the casing, so as to inhibit access of liquid to the upper bearing 11.

In the operation of the apparatus of the present invention, the distance separating the fixed and rotatable electrodes may be adjusted with the closure plate 4 removed from the casing, after which the closure plate may be secured in place and the reaction chamber filled with a suitable organic liquid, such as a petroleum oil product or other liquid hydrocarbon, to a level somewhat above the outlet opening 47, by opening valve 54b and supplying said liquid through the by-pass 54a. The by-pass valve 54b may then be closed and the rotatable electrode assembly set in motion by energizing the motor 16 by closing the switch 76, and adjusting the speed of rotation of said assembly by means of rheostat 77.

Closure of the switch 69a, after the speed of rotation of the rotatable electrode assembly has been adjusted at the desired rate, will cause arc discharges to be established between the fixed and rotatable electrodes of each pair, the rotatable electrodes being electrically interconnected through the shaft and being preferably grounded to the casing through the bearing means thereof or otherwise, and the casing being grounded as indicated at 78. The relay 71, in series with the motor 16, operates to energize the circuit breaker 69 and thus open the main power circuit when, for any reason, the motor 16 is not supplied with energy. The switch 76 may be of the overload circuit-breaker type, if desired, whereby the motor circuit is automatically opened when said motor is subjected to excessive overload such as upon occasion, for example, of seizure of one of the bearings. The apparatus is, therefore, provided with means for shutting off the arc current whenever rotation of the electrode assembly ceases, either because of failure of the power supply of driving motor 16 or because of stopping or excessive overloading of said motor for any reason.

As the liquid under dissociation treatment becomes heated due to the action of the several arcs, the thermostatic control element 52 will open the valve 53 and cause fresh liquid to be admitted to the interior of the reaction chamber. As the temperature reaches a certain predetermined normal operating temperature, a certain rate of inflow of liquid will be established under control of valve 53. Any increase of temperature above this point will cause an increased rate of supply of liquid until the temperature is restored, while a decrease in temperature will cause a corresponding decrease in rate of liquid supply. The element 52 may be of any of the well known and commercially available types of temperature regulators, the type shown being one which is operated by means of a liquid which is adapted to expand when heated, operating with positive pressure against a diaphragm in the valve 53 in such direction as to open said valve. It has been found that this type of valve obtains a very satisfactory temperature regulation within the apparatus.

The thermostatic control element 48 is adapted to cause a closing of the relay 72 circuit when the temperature of the liquid within the apparatus exceeds or reaches a predetermined point which is set as an upper limit for safe or efficient operation of the apparatus, causing energization of the circuit breaker 69 which will cut off the power to the electrodes. This feature provides for automatic interruption of the operation of the apparatus in the event that the liquid in the apparatus is caused to reach a dangerous or inefficient temperature for any reason, for example, by reason of interruption of the flow of liquid to or from the apparatus.

In Figs. 2 and 2a, the direction of rotation of the rotatable electrodes 7 is indicated by the arrow A, which direction will also be the direction of travel of the arc with respect to the fixed electrode 5. The arrow also represents the direction of rotary movement which will be imparted to the submerging liquid due to the stirring action of the rotating electrodes and electrode holders. It will be understood, however, that the speed of rotation of the liquid is somewhat slower than that of the rotating electrodes. Therefore, while the liquid moves forwardly over the surface of the fixed electrodes in the direction of the arrow A, it also moves rearwardly with respect to the rotating electrodes, as indicated for example by the short arrow L.

With the above in mind, when an arc is established between one of the fixed electrodes 7 and a rotating electrode 5 (either of the two rotating electrodes may start arcing, as will be subsequently described), the arc will form downwardly from the tip of the moving electrode, substantially along the minimum length arc path indicated at $a$ in Fig. 2a, and will be then caused to trail rearwardly from said tip to some such position as indicated at $b$, due to the constant rotation of the moving electrode with respect to the fixed electrode and the moving body of liquid. This trailing position of the arc is shown in both Fig. 2 and Fig. 2a. As the voltage between these electrodes diminishes, this arc will be extinguished, and a new arc will then be started, as before, when the voltage again increases to a point sufficient to strike such arc across the relatively short path $a$.

The speed of rotation of the moving electrodes, the arc voltage and the arc amperage may then be balanced until a substantially uniform and constant operation of the apparatus is established, the rate of throughput of the liquid being subsequently regulated so as to obtain the desired outlet temperature and, as the moving electrodes slowly but gradually wear away, the apparatus may be then regulated by adjustment of sleeve 21.

Due to the continual high velocity motion of the arc with respect to the liquid, the solid and gaseous products of dissociation become entrapped in the liquid and are thus quickly removed from the arc while the arc continually contacts fresh liquid surfaces. In addition to this removal of both solid and gaseous products of dissociation from the arc by the bodily movement of the arc, the centrifugal force produced by the rotation of the entire body of liquid influences the removal of the gaseous products from the path of the arc. Thus, as indicated in Fig. 2, the gaseous products will move inwardly toward the center of rotation of the electrodes, away from the arc, in some such manner as indicated by the dotted arrows G. It will be understood that the paths indicated represent the movement of such products with respect to the moving electrode and arc and not with respect to the moving liquid or with respect to the fixed electrode. It may be seen that, due to this constant centrifugal separation of the gaseous products of dissociation from the liquid, the arc will constantly meet liquid (at a point such as P) which is substantially free of any such gaseous products, whereby the arc is allowed to take place in such a place and under such conditions that the resistance thereto remains substantially constant, which explains the remarkably uniform operation of the apparatus of the present invention. Furthermore, this liquid contacts the elongated arc along the forward and lateral surfaces thereof, and the invention thus provides maximum contact of the liquid with the arc. However, in spite of the removal of the major portion of the dissociation products from the region of the arc, it is apparent that a sufficient quantity of ionized vapors, having relatively high conductivity, is maintained adjacent the tip of the moving electrode and downwardly and rearwardly therefrom between the time of extinguishing of one arc and formation of the next arc, to permit such next arc to be formed at relatively low striking potential. These two factors work together, because the reduction of the requisite striking potential, in turn, permits the arc to be formed earlier in the next half-cycle than would otherwise be the case, and consequently minimizes the travel of the rotating electrode between successive arcs and also minimizes the time during which this ionized conductive medium must be retained in position in order to act as above described. The retention of the ionized medium in the position aforesaid may be due in part, at least, to trapping of a small quantity of vapors directly behind the trailing face of the rotating electrode.

While, as above stated, the velocity of motion of the rotating electrode is preferably high in order to obtain the advantages above set forth, it will be understood that as the velocity of said electrode relative to the liquid is increased the attenuation of the arc is also increased and that at excessively high velocities such attenuation will become so great as to cause interruption of the arc at such an early point in each one-half cycle as to materially reduce the proportion of the time during which arcing is maintained and thus prevent any further increase in efficiency of carbon-black production. In other words, a critical electrode speed exists above which a further increase in speed produces no substantial increase in carbon-black production, and according to a preferred embodiment of this invention, the rotating electrode is moved at approximately this critical speed, which may be determined by trial in any particular case.

It will be understood that but one of the rotating electrodes 7 of each unit will be forming an arc with the corresponding fixed electrodes 5 at any one time. The arc will obviously form at that particular electrode which encounters the least electrical resistance between it and the fixed electrode and after an arc has once formed at a particular electrode, such arc will be maintained at that electrode until the apparatus has been stopped or until conditions arise which would render the electrical resistance around the unarcing electrode less than that established at the arcing electrode. It is sometimes advisable to interrupt the supply of power to the electrodes after a suitable period of operation of the apparatus and then renew the supply at which time the electrode which has been worn away the least will arc and the operation of the apparatus reestablished without necessitating adjustment of the gap distance between the electrodes. In addition to increasing the period during which the apparatus may be operated without requiring adjustment or replacing of electrodes, the provision of a plurality of electrodes 7 in each unit permits the centrifugal force on the shaft to be balanced by placing said electrodes at equal angular intervals around the shaft. Thus, in the present instance, two such electrodes are provided in each unit and are mounted 180° apart. While the form of apparatus above described has two rotatable electrodes in position so that either thereof may arc to a single fixed electrode, but it will be understood that any reasonable number of such electrodes may be employed, there being two such electrodes shown for the purpose of illustrating a balanced construction.

Another form of electrode unit which may be used is shown in Fig. 2b. Said electrode unit comprises an electrode holder 6A provided with a plurality of electrodes 7A, each of which is disposed in arcing relationship with the fixed electrode 5. In this manner, the longer life of a large electrode is obtained without the production of a large vapor pocket produced by a large rod.

A typical run of an apparatus of the above type which gives a very clear representation of the relative efficiency and production capacity thereof, is as follows:

| | |
|---|---|
| Capacity of treater | 30 gal. |
| Rated power capacity | 105 K. W. |
| Number of electrode pairs | 3 |
| Fixed electrode outside diameter | 8 inches |
| Fixed electrode inside diameter | 6 inches |
| Rotatable electrode diameter | 3/8 inches |
| Radius of rotation | 4–3 inches |
| Speed of rotation | 1450 R. P. M. |
| Velocity of electrode motion (average) | 44 ft/sec. |
| Arc gap between fixed and rotatable electrode | 1/4 inches |
| Line voltage | 2000 volts |
| Arcing current per arc | 25 amps. |
| K. V. A. per arc | 50 |
| Power consumption per arc | 35 K. W. |
| Power factor | 0.7 |
| Type of liquid | Kerosene |
| Rate of liquid circulation | 20 gal./min. |
| Inlet temperature (liquid) | 75° C. |
| Outlet temperature (liquid and gas) | 120° C. |
| Carbon-black per K. W. H | 0.25 lbs. |
| Carbon-black per arc per hour | 8+ lbs. |
| Total capacity of apparatus at 100 K. W | 25 lbs. carbon-black/hr. |

The power consumption per pound of carbon-black produced has been lowered to a considerable extent as compared to other types of apparatus previously used, due to the uniformity of the operating conditions, constant removal of the gaseous dissociation products from the arcing zone and due to the increased surface of arc which may contact the dissociable liquid.

The production capacity of a relatively small size treater is particularly remarkable and is due in part, at least, to the fact that an arc of considerably greater current density may be employed in the apparatus of the present invention without serious formation of carbon-trees due to the circulation conditions in the vicinity of the arc and also due to the fact that an arc of extended surface area is available to contact with the dissociable liquid whereby a larger quantity of liquid is subjected to dissociation at one time.

From the above data it may be seen that the average current density over the entire arcing surface at the end of the rotating electrode was approximately 225 amperes per square inch. As a result of this high ratio of current flow to electrode surface an arc is maintained which fills a relatively large part of the width of the space, at the rear of this electrode, so that good contact is afforded between this arc and the liquid streaming past the tip of said electrode. This is to be distinguished from the relatively poor contact which would be obtained if a relatively low current were employed, in which case the width of the arc would be small as compared to the width of the zone indicated at $b$ in Fig. 2, and since liquid flowing at high velocity past the electrode tip $7a$ does not readily re-enter toward the center of this zone immediately, the arc would operate largely in a pocket of gaseous products trapped behind said electrode, rather in direct contact with the liquid.

The form of apparatus shown in Figs. 4 to 7 inclusive, may comprise a casing 80, provided with supporting means such as legs 81, electrode driving or rotating means such as a variable speed motor 82 and gap adjustment means 83. Three electrode units $V_1$, $V_2$ and $V_3$ are provided within said casing. The electrode units each comprise one or more pairs of oppositely charged electrodes mounted for concurrent rotation beneath a body of liquid maintained in the casing 80. In the drawings, each unit comprises two pairs of electrodes mounted 180° apart. The upper member of each electrode pair is shown as mounted on a hollow shaft 84, which shaft is formed of bakelite or other electrically insulating material, and the lower member of each electrode unit is shown as mounted on a shaft 85 extending through the hollow shaft 84. The upper member comprises a hub portion 86 secured to the shaft 84 in any suitable manner, as by means of set-screws 86a for example, and provided with one or more radial arms 87 carrying the electrodes 88 adjacent the outer ends thereof. Electrodes 88 are preferably of small cross-section, such as rods, and are preferably inclined upwardly in the direction of rotation thereof at a suitable angle, for example, at an angle of approximately 60° with respect to the vertical. The lower member comprises one or more arms 89 threadedly or otherwise secured to the shaft 85 and extending through inclined slots 90 in the hollow shaft 84, and carrying the electrodes 91 adjacent their outer ends. Said electrodes 91 are shown as comprising blocks having upper faces 91a extended somewhat rearwardly in the path of rotation thereof. Each electrode 88 is mounted above a corresponding electrode 91, at such height as to provide a relatively small arc gap therebetween, as shown at $a'$ in Fig. 7. When the electrodes 91 are made of somewhat extended length in the path of rotation, each electrode 88 is mounted with its lower arcing end above the forward portion of the corresponding electrode 91, so as to permit the arc to be extended rearwardly therefrom.

The driving means 82 is connected to the shaft 85 through the gears 92 at the lower end 85a of said shaft, said lower end of said shaft projecting through the bottom wall of the casing 80 through a packing-gland 93, the weight of said shaft and the lower members of each electrode unit being carried by a suitable thrust bearing 94.

The hollow shaft 84 is adapted for sliding vertical movement with respect to the shaft 85 and means are provided for adjustably moving said shaft so as to vary the gap distance between the upper and lower electrodes of each unit. Said adjustment means may comprise a structure such as is shown at 83, in which a short shaft 95, secured to the upper end of the hollow shaft 84 in any suitable manner as, for example, by means of pins 95, projects through the upper wall of said casing through a packing gland 96. The shaft 95 extends through a threaded adjustment sleeve 97 and is supported at the upper end of said sleeve by means of thrust bearing 98.

The adjustment sleeve is threadedly mounted in a hanger 99 mounted on the upper wall of the casing 80 and is further provided with a handwheel 100 whereby said sleeve may be rotated and thus moved, together with the shafts 84 and 85, upwardly or downwardly dependent upon the direction of such rotation. The sleeve may be further provided, if desired, with a lock-collar 101 whereby said sleeve may be securely held in any desired position of elevation.

The upper members of the electrode units being each mounted upon the electrically non-conductive hollow shaft 84 are consequently insulated from each other while the lower members of each electrode unit are electrically connected to each other through the shaft 85, said shaft being grounded through the frame to the ground as at 102. Electrical connection is provided to each of the upper members 88 of the electrode units in any suitable manner as, for example, by means of a brush 103 in contact with the hub portion 86 of each of said members, said brush being electrically connected to a suitable outside power source, as by means of conducting support 104 connected to a lead 105 extending with the insulated through insulating bushing 105a.

In the operation of the above described form of apparatus, the casing or reaction chamber 80 is filled with a suitable liquid through the inlet 106, a suitable outlet for gaseous and liquid dissociation products being provided at 107. Rotation of the electrodes is then established and current is supplied to the upper members of each electrode pair. Referring to Fig. 7, the upper and lower electrodes, 88 and 91 respectively, are shown in arcing relation, the arrows F indicating the direction of travel of the electrodes with respect to the submerging liquid. When the electrodes are energized, the arcing takes place between said electrodes in a downward direction from the upper electrode to the lower at some such point as shown at $a'$, after which the arc, due to the pressure of liquid upon the forward face thereof, is extended rearwardly along the electrode 91, which in this case has a somewhat extended area in the direction of movement thereof, and assumes a position such as is shown diagrammatically at $b'$.

It will be understood that the indication of the arc position as at $a'$ and $b'$ is solely for the purpose of giving a general idea of the manner in which the arc is drawn rearwardly of the electrodes, and this is not intended to limit the position of the arc to any particular location on the electrodes.

It will be seen that, upon adjustment of the upper members of the electrode units so as to vary the gap between the upper and lower members, the lower members remain at a constant level and the upper members are lowered with respect thereto, and, due to the inclination of the slot 90, a relative rotation of the two electrode members is effected so as to cause the electrode tip 88a to remain positioned in substantially the same relative position with respect to the electrode 91, as shown in Fig. 5. Fig. 6 indicates the position of the electrode members with the upper member in an elevated position, the slot 90 being clearly shown. Rotation of the upper members is effected through rotational engagement of the shafts 84 and 85 by the lower member electrode arms 89.

If it is desired, for any particular purpose, the type of electrodes shown in Fig. 8 may be used, in which the upper and lower electrodes 88' and 91' are of the same type, that is, of relatively small cross-sectional area, and in that case the arc will form between the ends of the electrodes as at $a''$ and will be subsequently moved rearwardly at the center portion and assume some such position as indicated by the dotted lines at $b''$. It will be understood that any suitable means may be provided for mounting these electrodes for concurrent motion through the submerging liquid, and any suitable means for adjusting the arc gap between the electrodes may be employed. For example, the upper and lower electrodes may be mounted in pairs, on concurrently rotatable shafts, in substantially the same manner as shown in Figs. 4 to 7, and any suitable means may be provided for effecting relative axial movement of said shafts for the purpose of arc gap adjustment.

The form of apparatus shown in Figs. 9 and 10 illustrates a construction in which the energized electrodes are fixed with respect to the remainder of the apparatus, relative movement of the arc with respect to the liquid being obtained by forcing the liquid past the arc. In this form of apparatus it is advisable, in general, to provide a grounded electrode which is relatively movable with respect to the charged electrodes so that the arc is not positioned in any one place for a very great period of time, thus eliminating the formation of a serious amount of "carbon-trees."

The advantage of an apparatus of the above type lies in the fact that liquid may be supplied to the arcing zones by means of a centrifugal pump and after the liquid has passed the arcing zones, it may be passed through a suitable form of centrifugal separator whereby the gaseous products of dissociation are separated from the liquid and solid products which are then returned through the arcing zone, establishing substantially a continuous cycle in which the liquid is supplied to the arcing zone under optimum conditions.

The form of device shown in these figures may comprise a conduit 108 formed of porcelain or other suitable insulating material having refractory characteristics, said conduit being provided with a plurality of bosses 109 through which the energized electrodes 110 may be extended through suitable packing glands 111, the electrodes being inclined somewhat in the direction of liquid flow through the conduit, such flow direction being indicated by the arrow D.

The grounded electrode may comprise an elongated cylindrical or frusto-conical member 112 mounted on a rod 113 disposed substantially axially with respect to the conduit 108, as shown, said rod being provided with bearing means 114 in which said rod is rotatably and slidably mounted. The electrode 112 is shown as being somewhat tapered from the forward to the rearward end, whereby adjustment of the arc gap between it and the fixed charged electrodes 110 may be obtained by longitudinal movement of said grounded electrode.

Means for effecting longitudinal movement of the grounded electrode, as well as a rotative movement thereof, may comprise a structure as is set forth in detail in Fig. 9, in which the conduit 108 is shown as provided with connection at one end with an elbow 115 whereby the rod 113 may be extended outside of the conduit through a packing gland 116. The means for effecting longitudinal adjustment of the rod 113 and the electrode 112 may comprise a threaded adjustment sleeve 117 through which the rod rotatably extends, said rod being provided with bearing means at the outer end thereof as at 118. The adjustment sleeve is threadedly engaged by the end portion 119 of the hanger 120 mounted in some suitable manner on the conduit elbow 115, and the rod 113 and the electrode 112 are adapted to be moved longitudinally with the adjustment sleeve 117 upon rotation of said sleeve, said sleeve being preferably provided with suitable means for effecting rotation thereof, such as a hand-wheel 117a, and is further preferably also provided with a lock-collar 121 for securing the same in any desired position. Any suitable type of pumping means may be provided for producing the liquid circulation through the conduit, and it will be comprehended that the treated liquid may be passed through any suitable type of gas separator for removal of the gaseous dissociation products and then returned for retreatment, and that portions of the treated liquid may be removed from the circuit at any desired point for recovery of the carbon-black, and fresh liquid may be introduced at any point.

The means for effecting rotation of the rod 113 and the electrode 112 may comprise a motor 122 provided with a worm gear 123 engaging the worm wheel 124 slidably keyed to the rod 113. The rod 113 is provided with a keyway of sufficient length to allow the gear to remain in position between the support members 125 of the hanger 120 independent of the position of longitudinal adjustment of the rod 113.

In the operation of the above described form of device, a flow of liquid is established in the conduit 108 in the direction indicated by the arrow D, rotation of the electrode 112 is effected by energization of the motor 122 and power is supplied to the several electrodes 110, the electrode 112 being grounded through the apparatus and the apparatus grounded as at 126. The arc discharge will take place from the tips of the electrodes 110 to the rotating electrode 112, the motion of the liquid with respect to the electrodes obtaining a trailing of said arc, whereby the arc is drawn rearwardly of the electrodes in much the same manner as though the electrodes were passing through the liquid. The rotation of the grounded electrode 112 prevents the formation of serious amounts of "carbon-trees" thereon, and materially contributes to the uniformity of operation of this type of apparatus. It will be understood, however, that the rotation of the grounded electrode may be relatively slow, and in some cases may be entirely eliminated, as the function of such rotation is to provide relative movement between it and the electrodes 110, rather than to effect movement of the arc with respect to the liquid, which is in this case obtained by the high velocity flow of the liquid itself past the electrodes.

As the electrodes 110 wear away, the electrode 112 may be moved longitudinally as above described to close the gap between the electrodes and when all possible adjustment is obtained in this manner, the electrode 112 may be returned to the position shown and the electrodes 110 moved inwardly the required amount and the adjustment sequence repeated.

With an apparatus of the above described type, the electrodes 110 are subjected to substantially the same conditions as the electrodes 7 in the first-described form of device as regards the vapor pocket adjacent the trailing ends thereof, and the liquid circulation conditions about the arc established between the electrodes 110 and 112 are in general quite comparable to those obtained in the previously described forms of apparatus.

It will be comprehended that suitable supply of current at the desired potential is provided to the charged electrodes of the forms of apparatus shown in Figs. 4 and 9, for example, in the same general manner as shown in Fig. 3 in connection with the first-described form of apparatus, or any other desired method of supplying electrical energy to said electrodes may be provided.

I claim:

1. An apparatus for obtaining high yields of carbon-black by electrothermal dissociation of organic liquids, comprising: a reaction chamber; means for maintaining a body of organic liquid within said chamber; opposing electrode means disposed in continuous arcing relationship beneath the level of such body of liquid; means providing continuous positive movement of one of said electrode means and said liquid relative to one another, said one electrode means being of small cross-sectional area and inclined at an angle away from the other of said electrode means and forwardly in the direction of relative movement thereof; and means for supplying electrical energy to said electrode means.

2. An apparatus for obtaining high yields of carbon-black by electrothermal dissociation of organic liquids, comprising: a chamber adapted to hold a body of organic liquid; two oppositely charged electrodes having electrode surfaces disposed in continuous arcing relationship beneath the surface of such liquid body; means producing continuous movement of said electrodes and said liquid relative to one another, at least one of said electrodes having a relatively small arcing surface and being inclined at an angle away from the other of said electrodes and forwardly in the direction of relative movement thereof; and means for supplying electrical energy to said electrodes.

3. An apparatus for obtaining high yields of carbon-black by electrothermal dissociation of organic liquids, comprising a chamber adapted to hold a body of liquid, opposing electrode means disposed in continuous arcing relationship beneath the level of said liquid body, electrical energy supply means connected to said electrode means to produce an arc therebetween, means producing continuous positive movement of said arc and said liquid relative to one another, one of said electrode means being of small cross-sectional area and inclined from its arcing face forwardly in the direction of movement of said arc and away from the other of said electrode means.

4. The invention set forth in claim 3, said other electrode means having an arcing surface extending rearwardly of said one electrode in the direction of said movement.

5. An apparatus for obtaining high yields of carbon-black by electrothermal dissociation of organic liquids, comprising: a reaction chamber; means for maintaining a body of liquid within said chamber; electrode means comprising two oppositely charged electrodes having opposing arcing surfaces disposed in continuous arcing relationship beneath the surface of said liquid body; means producing continuous positive movement of one of said electrodes in a circular path through said liquid, said one electrode having a relatively small arcing surface and the other of said electrodes having an arcing surface extending rearwardly of said arcing surface of said one electrode, and said one electrode being inclined from its arcing surface forwardly in the direction of travel thereof and away from said other electrode; and means supplying electrical energy to said electrode means.

6. An apparatus for obtaining high yields of carbon-black by electrothermal dissociation of organic liquids, comprising: a casing adapted to hold a body of liquid; a shaft rotatably disposed within said casing; a plurality of electrodes mounted on said shaft at different positions along the length thereof and adapted to be rotated therewith and each having a relatively small arcing surface at the end thereof; a plurality of fixed electrodes having arcing surfaces of extended area so disposed so as to be in substantially continuous arcing relationship with respect to the arcing surfaces of the respective first-named electrodes and in planes substantially normal to the axis of rotation of said shaft; means for rotating said shaft; and means supplying electrical energy to said first and said second-named electrodes; each of said first-named electrodes being inclined away from the opposing fixed electrode and forwardly in the direction of rotation.

7. An apparatus for obtaining high yields of carbon-black by electrothermal dissociation of organic liquids, comprising: a reaction chamber; means for maintaining a body of liquid within said chamber; a shaft rotatably disposed within said chamber; electrode means mounted on said shaft and constrained to rotate therewith in a circular path through said liquid body, said electrode means comprising two oppositely disposed oppositely charged electrodes at least one of which is provided with an arcing surface of restricted area and is inclined away from the other of said electrodes and forwardly in the direction of rotation thereof; means for rotating said shaft; and means supplying electrical energy to said electrode means.

8. The invention set forth in claim 7, in which the other of said electrodes is provided with an arcing surface extending rearwardly from the arcing surface of said inclined electrode with respect to the direction of motion thereof.

9. The invention set forth in claim 7, the other of said electrodes being also provided with an arcing surface of restricted area and being also inclined away from the arcing surface of the opposing electrode and forwardly in the direction of motion thereof.

10. An apparatus for obtaining high yields of carbon-black by electrothermal dissociation of organic liquids, comprising a reaction chamber, a hollow shaft rotatably disposed within said chamber, a plurality of electrodes disposed at intervals along the length of said shaft and constrained to rotate therewith, a shaft rotatably and slidably disposed within said first-named shaft, a plurality of electrode arms secured to said second-named shaft and extending through suitable apertures in the side walls of said first-named shaft, a plurality of electrodes disposed on the respective electrode arms in such manner as to be in continuous arcing relationship with respect to the respective first-named electrodes, all of said electrodes being submerged beneath said liquid body, means producing concurrent motion of said electrodes through said liquid upon rotation of said first-named shaft, and means supplying electrical energy to said first and second-named electrodes.

11. An apparatus for obtaining high yields of carbon-black by electrothermal dissociation of organic liquids, comprising: a reaction chamber adapted to contain liquid; an electrode extending longitudinally within said chamber; one or more oppositely charged electrodes extending inwardly within said chamber and having their inner ends disposed in arcing relationship with said first-named electrode; means for maintaining flow of liquid longitudinally through said chamber past said electrodes, said second-named electrodes being inclined outwardly away from said first-named electrode and rearwardly with respect to the direction of movement of said liquid; and means supplying electrical energy to said electrodes.

12. The invention set forth in claim 11, said first-named electrode being formed as a frusto-conical body, and said invention also comprising means for moving said first-named electrode longitudinally within said chamber whereby the distance separating said first and second-named electrodes may be varied.

JOHN J. JAKOSKY.